United States Patent [19]
Yoshida

[11] 4,322,712
[45] Mar. 30, 1982

[54] ELEVATOR SPEED DETECTING APPARATUS

[75] Inventor: Masayuki Yoshida, Inazawa, Japan

[73] Assignee: Mitsubishi Denki Kabushiki Kaisha, Aichi, Japan

[21] Appl. No.: 89,666

[22] Filed: Oct. 30, 1979

[30] Foreign Application Priority Data

Nov. 1, 1978 [JP] Japan .............................. 53-150715[U]

[51] Int. Cl.³ .......................... B66B 3/00; G08B 21/00
[52] U.S. Cl. .................................... 340/19 R; 187/39; 324/166; 318/327; 340/670
[58] Field of Search ...................... 340/19 R, 671, 670; 187/39; 73/518, 506; 324/166; 318/326, 327, 328, 309

[56] References Cited

U.S. PATENT DOCUMENTS

| 3,222,550 | 12/1965 | Willard et al. | 324/166 |
| 3,706,035 | 12/1972 | Hoehn | 324/166 |
| 3,898,611 | 8/1975 | Mandel | 340/19 R |
| 4,008,424 | 2/1977 | Bompani | 318/327 |

Primary Examiner—Glen R. Swann, III

Attorney, Agent, or Firm—Sughrue, Mion, Zinn, Macpeak & Seas

[57] ABSTRACT

An apparatus for detecting and controlling an elevator speed which includes a rotary disc rotated by a motor which moves an elevator cage and including a pulse generator which produces a pulse signal proportional to an elevator speed in cooperation with the rotary disc. The pulse signal is differentiated by a differentiation circuit and the output signal of the differentiation circuit is rectified by a full-wave rectifying circuit with the output signal of the rectifying circuit supplied to a monostable multivibrator. The output signal of the multivibrator is smoothed by a smoothing circuit which thereby produces an analog speed control signal. The multivibrator includes a zener diode operating to decrease the voltage level of the smoothing circuit output should the power source voltage drift. The rotary disc has projecting portions and apertures between the projecting portions all of which are of the same shape and width. The pulse generator detects a ray of light or magnetic flux passing through the apertures in the rotary disc generating the pulse signal during the rotation of the rotary disc.

13 Claims, 15 Drawing Figures

ELEVATOR SPEED DETECTING APPARATUS

BACKGROUND OF THE INVENTION

1. Field of the Invention

This invention relates to an apparatus for detecting an elevator speed, especially to one including a pulse generator which produces output pulses which correspond to the elevator speed and which are employed as an elevator speed signal.

2. Description of the Prior Art

In recent years, speed, landing operations, and the forces felt by passengers of an elevator system have been controlled through a feedback system which utilizes a detection of the elevator's speed.

In general, either a D.C. or A.C. tachometer has been employed for detecting the elevator speed. The tachometer is driven directly by a shaft of a traction machine or driven through a power transfer device such as driving belts. In either case, the shaft must be extended to drive the tachometer making it inconvenient to mount the traction machine within a limited space of a machine room and making it difficult to lift the traction machine for mounting. Further, in the case of the D.C. tachometer, necessary maintenance of a commutator and brushes is troublesome and, especially in the case where belts are employed, maintenance has proved particularly laborious. Moreover, a ripple component is usually included in the output of the tachometer due to vibration of the belt or the like.

To remedy these problems, A.C. tachometers have commonly been employed connected directly with the traction machine shaft. In this case, it is necessary to provide a rectifier which converts the output of the A.C. tachometer to D.C. Due to the forward voltage drop of the rectifier, no output signal from the rectifier appears when the speed of the traction machine is very low. Accordingly, an A.C. tachometer cannot be used for significantly low speed control.

To eliminate this defect, a speed detecting device is preferably used which includes a rotary disc formed in a predetermined shape and mounted on a motor shaft. An adjacently positioned pulse generator produces pulses proportional to the elevator speed in conjunction with rotation of the rotary disc. This enables the detection of the elevator speed with a high accuracy and makes unnecessary an increase in the required space for the traction machine. This type of speed detecting apparatus usually includes the pulse generator, a wave-forming circuit connected to the output of the pulse generator, and a smoothing circuit connected to the output of the wave-forming circuit for providing an analog speed signal. An example of this type of apparatus is shown in FIG. 1 and a waveform from the apparatus is shown in FIG. 2 to aid in an explanation of its operation.

In FIG. 1, a digital-to-analog converter 9 includes a monostable multivibrator 93 which generates output voltage pulses proportional to an input signal and a smoothing circuit 94 which produces an analog speed signal proportional to the input pulse rate. Both of these are connected to a D.C. power source 8. The multivibrator 93 includes a transistor 12 which is normally in the OFF state, another transistor 13 which is normally ON, a timing condenser 14 connected between the collector of the transistor 12 and the base of the transistor 13, a timing resistor 15 connected between the base of the transistor 13 and the positive terminal of a power source, a coupling resistor 16 connected between the base of the transistor 12 and the collector of the transistor 13, current limiting resistors 17 and 18 for limiting the collector currents, and an output terminal 31 connected to the collector of the transistor 13. Pulses proportional to the elevator speed produced by a pulse generating device (not shown) are supplied to the collector of the transistor 12 through an input terminal 29.

The smoothing circuit 94 includes a smoothing condenser 20 connected between a ground or earth terminal of of the power source and the output terminal 30, a smoothing resistor 21 connected between the power source and the collector of the transistor 25, another smoothing resistor 22 connected between the collector of the transistor 25 and the output terminal 30 having the same resistance value as the smoothing resistor 21, a diode 23 connected in parallel with the smoothing resistor 22 to permit only a charging current to flow into the smoothing condenser 20, a transistor 24 with its collector connected to the power source through a current limiting resistor 26 and its base connected to the terminal 31 through a resistor 27, and a resistor 28 connected between the collector of the transistor 24 and the base of the transistor 25. The charging and discharging circuits for the condenser 20 have the same time constant. The emitters of each of transistor 12, 13, 24 and 25 are connected to ground.

In the prior art construction shown in FIG. 1, while the elevator cage and a counterweight are moved vertically up and down by the traction motor through a sheave and main rope, the pulse generating device produces pulses at a rate proportional to the speed of the elevator cage. The multivibrator 93 generates output pulses of a constant pulse width at output terminal 31 whenever the output pulses of the pulse generating device are supplied to the input terminal 29. The frequency of the output pulses generated by the multivibrator 93 is the same as that of the input pulses while the width of each output pulse is independent of the input pulse frequency. The output pulses from the multivibrator 93 are smoothed by the smoothing circuit 94. Specifically in regard to the smoothing operation, when the output at terminal 31 reaches a high level, the transistor 25 turns off and the smoothing condenser 20 is charged from the power source 8 of output voltage Vc at a rate set by the time constant determined by the values of the capacitance of the smoothing condenser 20 and the resistance of the smoothing resistor 21. When the output at terminal 31 drops to a low level, the transistor 25 turns on and the smoothing condenser 20 is discharged at a rate set by the time constant determined by the capacitance of the smoothing condenser 20 and the resistance of the smoothing resistor 22. Since the resistances of the smoothing resistor 21 and the smoothing resistor 22 are equal, the charging time constant is equal to the discharging time constant. Therefore, the voltage across the smoothing condenser 20, that is, the mean output voltage at the output terminal 30, is proportional to the frequency of the input pulses on the input terminal 29.

In the conventional construction, the monostable multivibrator was constructed as described above, so that the analog output on line 9a of the smoothing circuit 94 changes undesirably according to voltage changes of the power source 8. This will be apparent from the description which follows with reference to FIG. 2. In the conventional monostable multivibrator, it is known that the output pulse width does not change in dependence on the power source 8 voltage. This is seen in the waveform of FIG. 2 which represents the electric potential at the base of the transistor 13. However, the output pulse height of the multivibrator 93 changes according to voltage changes of the power source 8 such as from voltage $V_{c1}$ to voltage $V_{c2}$ in FIG. 2. Voltage changes in the power supply also cause voltage fluctuations at the output terminal 30. Therefore, the analog output, that is the analog speed signal on line 9a at the output terminal 30' changes according to the power supply voltage change. This means that a speed signal proportional to the elevator speed cannot be properly produced if the voltage of the power source 8 is subject to fluctuations.

Moreover, the smoothing circuit 94 cannot completely smooth the output of the multivibrator 93. Accordingly, the analog speed signal on line 9a has a ripple component and this ripple component gives rise to inaccurate control of the elevator speed especially at low speeds. In order to reduce the ripple component percentage of the analog speed signal, the smoothing circuit may be provided with a longer time constant. But a long time constant is undesirable for accurate and responsive control of the elevator speed.

SUMMARY OF THE INVENTION

Accordingly, it is an object of the present invention to provide a highly reliable elevator speed detecting apparatus.

It is another object of the present invention to provide an elevator speed detecting device which can generate an accurate elevator speed indicating signal which is unaffected in the power source voltage.

It is a further object of the present invention to provide an elevator speed detecting device which reduces the ripple component percentage of the analog speed signal without increasing the output frequency of the pulse generating device or without increasing the time constant of the smoothing circuit.

These objects of the present invention have been attained by providing an apparatus for detecting elevator speed including pulse generating means for generating a pulse train in response to the speed of an elevator cage, a monostable multivibrator connected to the pulse generating means for producing a pulse output signal in response to the pulse train, and a smoothing circuit connected to the multivibrator for producing a smoothed signal in response to the pulse output signal, the smoothed signal being employed as a control signal for controlling the speed of the elevator cage wherein the multivibrator includes means for controlling a pulse width of the pulse output signal so as to render the pulse width narrower with increases in the power supply voltage and wider with decreases in the power supply voltage.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF THE PREFERRED EMBODIMENTS

Figure 3:
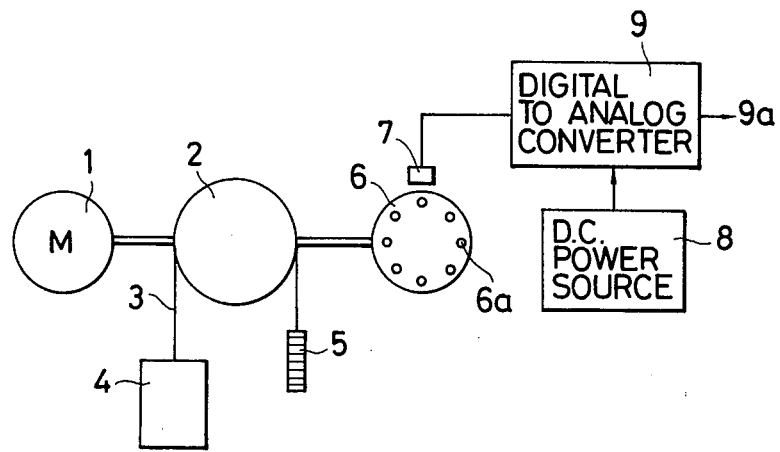
FIG. 3 is a schematic diagram showing one embodiment of an elevator speed detecting apparatus according to this invention.

FIGS. 3 through 6, show a first preferred embodiment of the present invention. In FIG. 3, the reference numeral 1 designates a traction motor. A sheave 2 is driven by the traction motor 1, and a main rope 3 is wound on the sheave 2. A cage 4 and a counterweight 5 are connected to the main rope 3 at respective ends thereof.

The traction motor 1 rotates a rotary disk 6 having plural openings 6a such as holes or cut-out portions disposed along the periphery of the disk. A pulse generator 7 generates pulses by detecting a magnetic flux or ray of light from a source (not shown) which passes through the openings 6a. The rotary disc 6 and the pulse generator 7 together form a pulse generating device. The reference numeral 8 designates a DC power source. A digital-to-analog converter 9 converts the frequency of the pulses generated by the pulse generator 7 into an analog voltage signal on line 9a. The output signal on 9a from the converter 9 changes in proportion to the speed of the cage 4.

Figure 4:
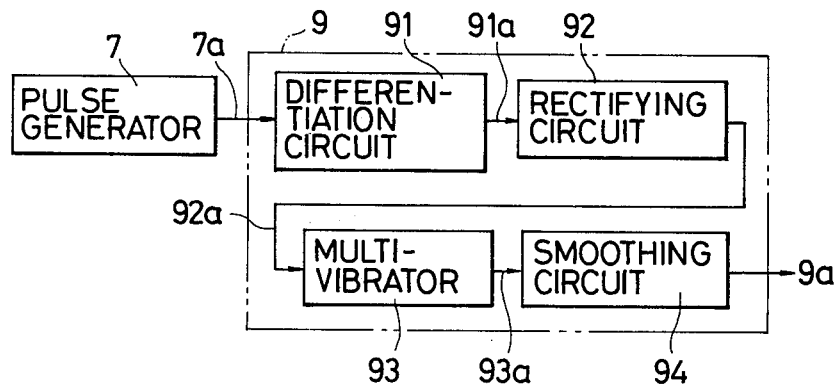
FIG. 4 is a block diagram showing a preferred arrangement of the electric circuit in FIG. 3.

In FIG. 4, the reference numeral 7a designates an output signal line from the pulse generator 7. A differentiation circuit 91 differentiates the output signal on line 7a from which it generates an output signal on line 91a. A rectifying circuit 92 rectifies the output signal on line 91a producing an output on line 92a. A monostable multivibrator 93 converts the output signal on line 92a into a signal having a rectangular waveform. A smoothing circuit 94 smoothes the output of the multivibrator 93. The output signal from the smoothing circuit 94 forms the analog speed signal.

Figure 1:
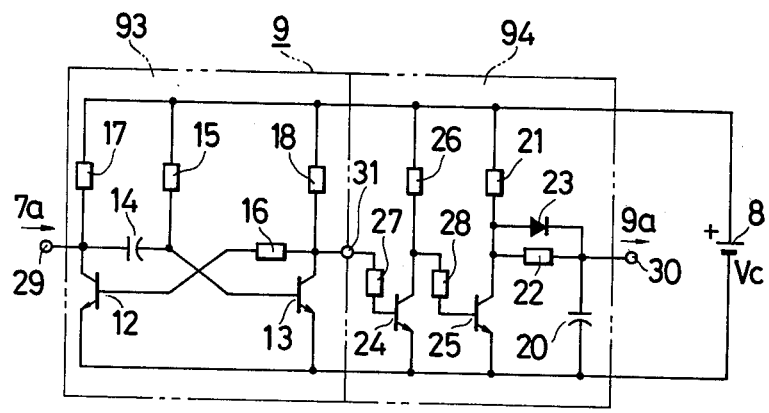
FIG. 1 is a schematic diagram showing the monostable multivibrator and smoothing circuit in a conventional elevator speed detecting apparatus.
Figure 2:
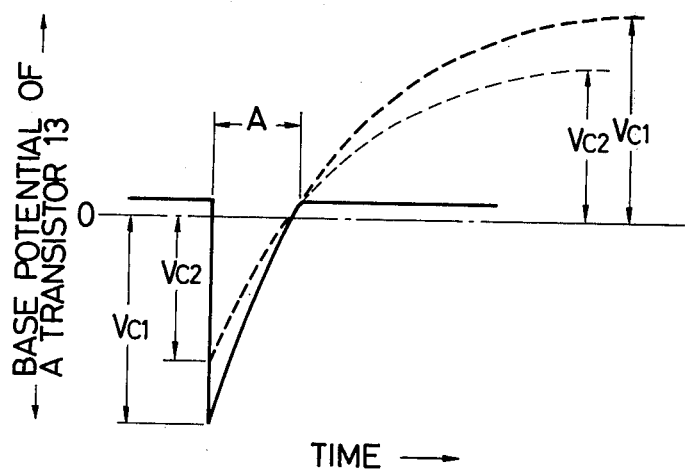
FIG. 2 is a explanatory chart showing the electric potential at the base of the transistor of the monostable multivibrator in FIG. 1.
Figure 5:
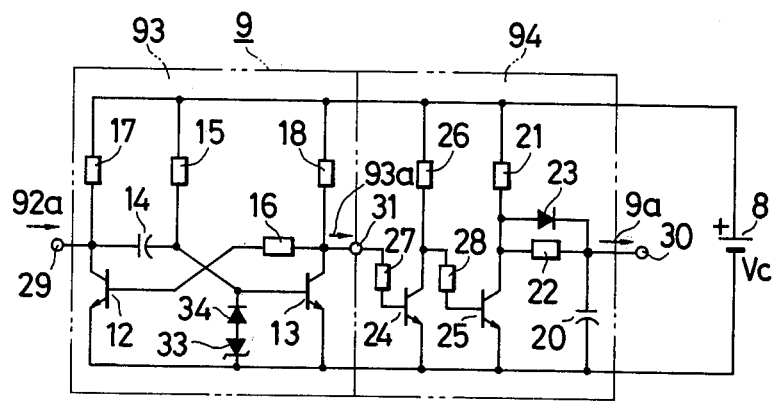
FIG. 5 is a detailed circuit diagram showing the monostable multivibrator and smoothing circuit in FIG. 4.

In FIGS. 1 and 5 like reference numeral designate similar components. In FIG. 5, reference numerals 33 designates a zener diode and 34 a diode. The zener diode 33 is provided for maintaining the negative base voltage of transistor 13 at a fixed value at the zener voltage thereof. The diode 34 is employed for preventing a forward current from flowing in the zener diode 33 into the base of the transistor 13 when the base voltage thereof is positive.

The technique of converting frequency to voltage in the circuit arrangement of FIG. 5 is similar to that of the circuit of FIG. 1. In FIGS. 3 through 5, the output pulses on line 7a from the pulse generator 7, the rate of which is proportional to the speed of the elevator, are differentiated by a differentiation circuit 91. The output on line 91a from the differentiation circuit 91 is rectified by the full-wave rectifying circuit 92 and the rectified signal on line 92a is supplied to the monostable multivibrator 93.

Figure 6:
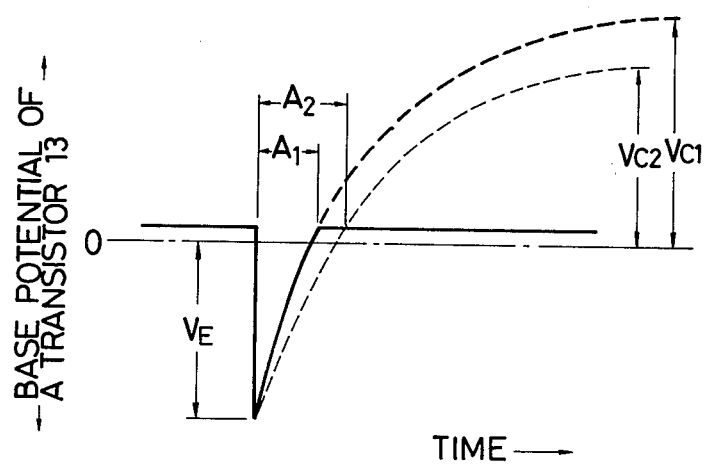
FIG. 6 is a explanatory chart showing an electric potential at the base of a transistor of the monostable multivibrator in FIG. 5.

In the monostable multivibrator 93, when the voltage at the base electrode of the transistor 13 is negative, it is limited to a fixed voltage Vz by the zener diode 33. The base electrode voltage recovers at different rates depending on the power source voltage, as shown in FIG. 6. Therefore, the nonconductive period of the transistor 13 changes in response to the voltage. Accordingly, the pulse narrows to $A_1$ as shown in FIG. 6 when the power source voltage Vc rises to $Vc_1$ while the width increases to $A_2$ as the power source voltage Vc falls to $Vc_2$.

On the other hand, the output level of the smoothing circuit 94 rises in response to increases in the power source voltage and falls in response to decreases in the power source voltage. Accordingly, the changes in the pulse width of the monostable multivibrator 93 and the changes in the output voltage of the smoothing circuit 94 cancel each other so that the level of the speed signal on line 9a does not change substantially in response to drift in the power voltage Vc.

Figure 7:
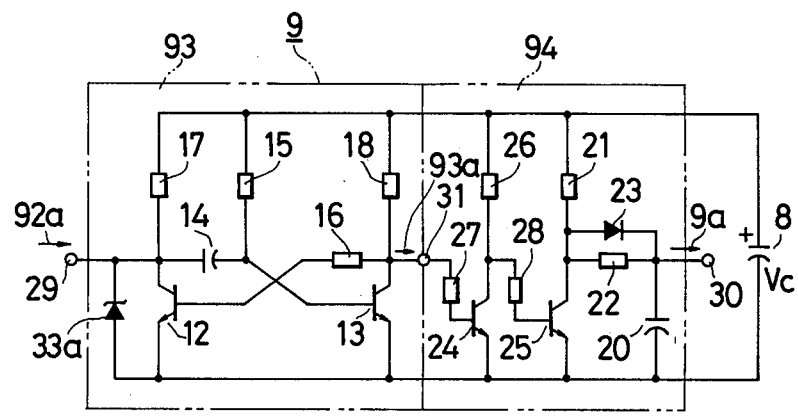
FIG. 7 is a circuit diagram showing another embodiment of the monostable multivibrator according to the invention.

FIG. 7 shows another embodiment of this invention. In this embodiment, a zener diode 33a is connected between the input terminal 29 and ground which is employed to limit the negative voltage at the base of the transistor 13 to a fixed zener voltage Vz through the capacitor 14. Otherwise, this embodiment operates similarly to the embodiment of FIG. 5.

Another embodiment of this invention, with particular regard to the pulse generating circuit, will be described in detail in connection with FIGS. 8 through 11.

Figure 8:
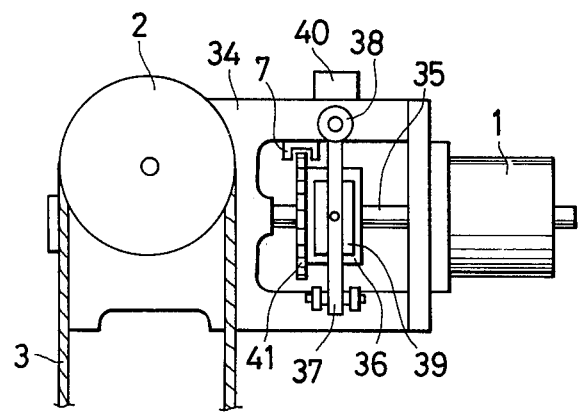
FIG. 8 is a elevational view showing the arrangement of a traction machine with a rotary disk according to the invention.
Figure 9:
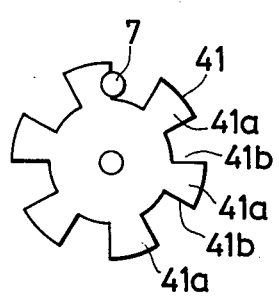
FIG. 9 is a enlarged elevational view showing the pulse generating device in FIG. 8.
Figure 10:
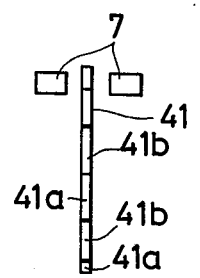
FIG. 10 is a side view showing the pulse generating device in FIG. 9.

In FIG. 8, reference numeral 2 designates a traction sheave. The rotation of a motor 1 is reduced by worms and worm gears and is transmitted to the traction sheave 2. A main rope 3 connected to the elevator cage and a counterweight (not shown in FIG. 8) are entrained through the traction sheave 2. Reference numeral 34 designates a traction machine frame and 35 a motor shaft. A brake wheel 36 is secured to the motor shaft 35. A brake arm 37 has a lower end pivoted to the traction machine frame 34 and an upper end pressed by a spring 38 in the direction of the brake wheel 36. A brake shoe 39 is mounted on the central portion of the brake arm 37 which is pressed on the periphery of the brake wheel 36. An electromagnet 40 is secured to the traction machine frame 34 and is employed to separate the brake shoe 39 from the brake wheel 36 working against the pressure of the spring 38. A rotary disc 41 for generating pulses is affixed to the side wall of the brake wheel 36. The rotary disc 41 has projecting portions 41a and spacing portions 41b defined between each projecting portions 41a. The projecting portions 41a and spacing portions 41b have the same shape as shown in FIG. 9. The pulse generator 7 detects light or magnetic flux passing through the spacing portions 41b of the rotary disc 41 generating pulse signals as the disc 41 rotates. The output signal on line 7a from the pulse generator 7 is employed as an input signal to the differentiation circuit 91 in FIG. 4.

The operation of this embodiment will be described in connection with FIGS. 4 and 8 through 11. When the motor 1 is started, the electromagnet 40 simultaneously moves the brake arm 37 to separate the brake shoe 39 from the brake wheel 36. Also, the traction sheave 2 is driven so as to operate the elevator cage via the main rope 3. The disc 41 is also rotated and the pulse generator 7 produces output pulses on line 7a according to the projecting portions 41a and spacing portions 41b of the disc 41.

Figure 11A:
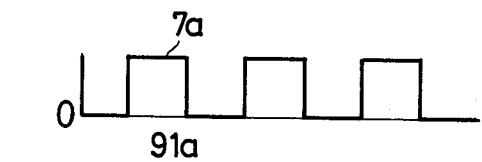
FIG. 11, including A-E, is a waveform chart showing the output waveform of each block in FIG. 4 while employing the pulse generating device of FIGS. 8 through 10.
Figure 11B:
Figure 11C:
Figure 11D:
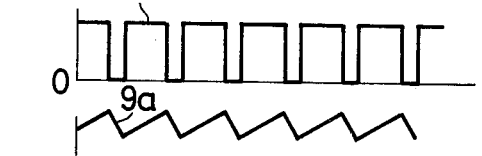
Figure 11E:

In this pulse generating operation, since the projecting portions 41a and spacing portions 41b have the same shape, the periods of the high and low level states of the output signal on line 7a are equal as shown in FIG. 11A. The differentiation circuit 91 differentiates the output on line 7a generating therefrom the signal on line 91a represented in FIG. 11B. The rectifying circuit 92 rectifies the output signal on line 91a and generates a signal on line 92a represented in FIG. 11C. Accordingly, the frequency of the signal on line 92a becomes twice the frequency of the output signal on line 7a. The signal on line 92a of the rectifying circuit 92 is coupled to a multivibrator 93 which generates a signal on line 93a as represented in FIG. 11D. The signal on line 93a from the multivibrator 93 is fed to a smoothing circuit 94 which generates therefrom an analogue speed signal on line 9a represented in FIG. 11E.

In the conventional device as described above, the ripple frequency of the analogue speed signal is the same as the frequency of the output signal produced by the pulse generator while the ripple frequency of the analogue speed signal on line 9a in the above-described embodiment of twice the frequency of the output signal on line 7a from the pulse generator 7. Accordingly, the percentage of ripple of the analogue speed signal is reduced to a great extent as compared with the conventional device.

In general, for the purpose of distinguishing the rotational direction of the traction sheave, two pulse generators are employed which generate respective signals which are mutually $\pi/2$ out of phase. In this case, when the analogue speed signal is generated by two pulse generators, the ripple frequency of the signal is four times that of a device of the prior art. Accordingly, the percentage of ripple of the analogue speed signal is further reduced.

As described above, the output pulse width of the monostable multivibrator changes so as to decrease the output error of the smoothing circuit caused by drift of the power supply voltage. Therefore, the output level of the elevator speed detecting apparatus does not change with drift of the power voltage.

Moreover, an apparatus of the invention can be produced by adding only a zener diode to a conventional monostable multivibrator to achieve the above-described mode of operation. Therefore the apparatus of the invention can be implemented in a relatively simple electric circuit arrangement.

Furthermore, as the rotary disc is formed so as to equalize the periods of the high and low level states of the pulse generator output and the output signal of the pulse generator is differentiated and rectified increasing the ripple frequency of analog speed signal, the percentage of ripple of the analogue speed signal is greatly reduced.

What is claimed is:

1. An apparatus for detecting the speed of an elevator comprising:

means for generating a pulse train in response to a speed of an elevator cage;

a monostable multivibrator having an input connected to said pulse generating means for producing a pulse output signal in response to said pulse train; and a smoothing circuit having an input connected to said multivibrator for producing a smoothed signal in response to said pulse output signal, said multivibrator including means for controlling a pulse width of said pulse output signal for rendering said pulse width narrower with an increasing power source voltage and wider with a decreasing power source voltage.

2. The apparatus as claimed in claim 1 wherein said monostable multivibrator comprises first and second transistors, a capacitor connected to a base electrode of said second transistor and a voltage regulator element for maintaining a voltage of said base electrode at no more than a predetermined fixed voltage for one voltage polarity.

3. The apparatus as claimed in claim 2 wherein said monostable multivibrator further comprises a diode connected serially with said voltage regulator element so as to prevent a base current of said second transistor from flowing into said voltage regulator element.

4. The apparatus as claimed in claim 1 wherein said monostable multivibrator comprises first and second transistors, a capacitor connected to a base electrode of said second transistor, and a voltage regulator element limiting a charging voltage of said capacitor to a predetermined fixed voltage.

5. The apparatus as claimed in claim 4 wherein said voltage regulator element is connected between a collector electrode and an emitter electrode of said first transistor.

6. An apparatus for detecting the speed of an elevator comprising:

a rotary member rotating in response to a speed of an elevator cage;

a pulse generator for producing a pulse train at a rate corresponding to said rotary member speed, said pulse train having alternate high and low level states substantially equal in width with one another;

a differentiation circuit having an input connected to said pulse generator for differentiating said pulse train;

a full-wave rectifying circuit having an input connected to said differentiation circuit for rectifying the differentiated pulse train;

a monostable multivibrator connected to said rectifying circuit for producing a pulse output signal, said multivibrator including means for controlling a pulse width of said pulse output signal, said controlling means rendering said pulse width narrower with an increasing power source voltage and wider with a decreasing power source voltage; and a smoothing circuit connected to said multivibrator for generating a smoothed signal.

7. The apparatus as claimed in claim 6 wherein said monostable multivibrator comprises first and second transistors, a capacitor connected to a base electrode of said second transistor and a voltage regulator element for maintaining a voltage of said base electrode at no more than a predetermined fixed voltage for one voltage polarity.

8. The apparatus as claimed in claim 7 wherein said monostable multivibrator further comprises a diode connected serially with said voltage regulator element so as to prevent a base current of said second transistor from flowing into said voltage regulator element.

9. The apparatus as claimed in claim 6 wherein said monostable multivibrator comprises first and second transistors, a capacitor connected to a base electrode of said second transistor, and a voltage regulator element limiting a charging voltage of said capacitor to a predetermined fixed voltage.

10. The apparatus as claimed in claim 9 wherein said voltage regulator element is connected between a collector electrode and an emitter electrode of said first transistor.

11. An apparatus for detecting the speed of an elevator comprising:

a rotary member rotating in response to a speed of an elevator cage;

a pulse generator for producing a pulse train corresponding to said rotary member speed, said pulse train having alternately high and low level states, said high and said low level states being substantially equal in width;

a differentiation circuit connected to said pulse generator for differentiating said pulse train;

a full-wave rectification circuit connected to said differentiation circuit for generating a rectified signal, a monostable multivibrator circuit connected to said full-wave rectification circuit for generating multivibrator output pulses, said multivibrator circuit including means for controlling a pulse width of said output pulses to render said pulse width narrower with an increasing power source voltage and wider with a decreasing power source voltage, and a smoothing circuit connected to said monostable multivibrator circuit for generating a voltage level output proportional to elevator speed.

12. The apparatus as claimed in claims 6 or 11 wherein said rotary member has plural first and second portions alternately giving rise to said high and said low level states of said pulse train, first and second portions having substantially equal widths in a circumferential direction.

13. The apparatus as claimed in claim 6 or 11 wherein said rotary member is a rotary disc which includes plural projecting portions and spacing portions between said projecting portions, said projecting and spacing portions having substantially the same widths.

* * * * *